United States Patent
Erba et al.

(10) Patent No.: US 8,800,432 B2
(45) Date of Patent: Aug. 12, 2014

(54) APPARATUS AND A METHOD FOR REFILLING THE FILTER-HOLDERS OF AN ESPRESSO COFFEE MACHINE WITH SELECTED DOSES OF GROUND COFFEE TO ORDER

(75) Inventors: Roberto Erba, Binasco MI (IT); Davide Oresoli, Binasco MI (IT)

(73) Assignee: Gruppo Cimbali S.p.A., Binasco MI (IT)

(*) Notice: Subject to any disclaimer, the term of this patent is extended or adjusted under 35 U.S.C. 154(b) by 601 days.

(21) Appl. No.: 12/909,176

(22) Filed: Oct. 21, 2010

(65) Prior Publication Data

US 2011/0094391 A1   Apr. 28, 2011

(30) Foreign Application Priority Data

Oct. 23, 2009 (EP) .................................. 09425421

(51) Int. Cl.
 *A47J 31/06* (2006.01)
 *A47J 31/42* (2006.01)

(52) U.S. Cl.
 USPC .............................................. 99/285; 99/286

(58) Field of Classification Search
 USPC .......... 99/280, 285, 286, 289 R, 323; 241/30, 241/34, 36; 426/231
 See application file for complete search history.

(56) References Cited

U.S. PATENT DOCUMENTS

| 4,787,299 | A | * | 11/1988 | Levi et al. ........................ | 99/285 |
| 5,158,793 | A | * | 10/1992 | Helbling ........................ | 426/231 |
| 5,186,399 | A |   | 2/1993 | Knepler et al. | |
| 5,417,145 | A |   | 5/1995 | Joseph, Jr. et al. | |
| 5,660,336 | A |   | 8/1997 | Joseph, Jr. et al. | |
| 6,238,721 | B1 |   | 5/2001 | Knepler | |
| 2003/0129286 | A1 |   | 7/2003 | Knepler | |
| 2009/0095165 | A1 | * | 4/2009 | Nosler et al. ................. | 99/289 R |

FOREIGN PATENT DOCUMENTS

| DE | 202 00 419 | 5/2002 |
| EP | 0 153 549 | 9/1985 |
| EP | 0 280 594 | 8/1988 |
| EP | 0 766 943 | 4/1997 |
| EP | 0 818 170 | 1/1998 |
| EP | 1 174 065 | 1/2002 |
| WO | 00/27262 | 5/2000 |

OTHER PUBLICATIONS

European Search Report for EP 09 42 5421, dated Mar. 2, 2010.
Italy Search Report, dated Jun. 10, 2010.

* cited by examiner

Primary Examiner — Dana Ross
Assistant Examiner — Lindsey C Teaters
(74) Attorney, Agent, or Firm — Nixon & Vanderhye PC

(57) ABSTRACT

Apparatus for refilling the filter-holders of a machine for the preparation of espresso coffee with selected doses of ground coffee. The machine has a plurality of dispensing units for the preparation of coffee beverages, each dispensing unit having a detachable filter-holder and a plurality of keys for selecting the beverage to be dispensed and a coffee bean grinder and metering device provided with a hopper for supplying beans of a desired grain size. The grinder and metering device has a hopper for supplying ground coffee and supporting means for the filter-holder. An identification unit generates information for recognizing the filter-holder of a selected dispensing unit and information related to the dose with which the filter-holder is to be refilled. A detection unit detects the information generated by the identification unit. A wireless device transmits the information generated by the identification unit to the detection unit.

11 Claims, 4 Drawing Sheets

APPARATUS AND A METHOD FOR REFILLING THE FILTER-HOLDERS OF AN ESPRESSO COFFEE MACHINE WITH SELECTED DOSES OF GROUND COFFEE TO ORDER

This application claims priority to EP Application No. 09425421.6 filed 23 Oct. 2009, the entire contents of which is hereby incorporated by reference.

BACKGROUND OF THE INVENTION

The present invention relates to an apparatus for refilling the filter-holders of a machine for the preparation of espresso coffee with selected doses of ground coffee to order.

An apparatus as mentioned above is widely used as the basic fitting for an espresso coffee preparation station as might be found, for instance, in bars and restaurants.

As is known, moreover, the filter-holders of the machine are filled only at the time of preparation of the beverage by taking the filter-holder from the relative dispensing unit of the machine and positioning it in the appropriate support provided in the metering and grinding device.

The dose of ground coffee to be supplied to the filter-holder is preferably prepared to order by pressing a corresponding key disposed on the metering and grinding device. In this way the coffee is kept in bean form in the hopper and ground only to order, thereby advantageously retaining its flavour.

Apparatus constructed in accordance with the prior art described above has various drawbacks which may lead, among other things, to errors as regards the type of beverage prepared.

As is known, espresso coffee machines are required to supply different kinds of beverages which are influenced by the tastes and traditions of various countries and which therefore require different quantities of ground coffee or doses, which may also be ground to different grain sizes.

For instance, in order to prepare a small espresso coffee of the Mediterranean type of 15 $cm^3$, six grams of ground coffee are used on average while, to prepare a beaker of coffee of 120-150 $cm^3$ as consumed in northern Europe, up to nine grams of coffee may be needed.

The same kind of beverage may be prepared, moreover, from coffee roasted to differing extents or from decaffeinated coffee or even using single or double doses.

As the filter-holders of the machine have, as a result, to be filled in a variety of ways, it is quite possible for the beverages dispensed to differ from those actually ordered, leading to complaints, the need to replace the incorrect beverage and therefore losses of materials with economic repercussions which are particularly substantial in the case of apparatus installed in mass distribution outlets such as, for instance, service stations along motorways.

The object of the present invention is to remedy the drawbacks of the prior art by providing an apparatus which makes it possible to fill a filter-holder of a coffee machine in a highly accurate manner both in relation to the quality of the coffee needed to prepare the beverage requested and in relation to the quantity of the dose, as well as the degree to which the coffee needs to be ground for the beverage requested.

A further object of the present invention is to provide a method for filling the filter-holders of an espresso coffee machine with a desired dose of ground coffee in a highly automated and reliable manner in order to reduce the risk of filling errors.

SUMMARY OF THE INVENTION

The object is achieved by an apparatus for refilling the filter-holders of a machine for the preparation of espresso coffee with selected doses of ground coffee to order, comprising at least one machine for the preparation of espresso coffee the machine being provided with a plurality of dispensing units for the preparation of respective coffee beverages, each dispensing unit comprising a respective detachable filter-holder and a plurality of keys for selecting the beverage to be dispensed by the relative dispensing unit, at least one coffee bean grinder and metering device provided with a hopper for supplying the beans with adjustable grinding adapted to provide a desired grain size for the ground coffee, an outlet on the grinder and metering device for supplying the ground coffee and supporting means for maintaining the filter-holder of the coffee machine with respect to the supply outlet when it is being refilled with the dose of ground coffee, an identification unit on the espresso coffee machine generating information for recognising the filter-holder of a selected relative dispensing unit and information related to the type of dose with which the filter-holder is to be refilled, a detection unit on the coffee bean metering and grinding device for detecting the information generated by the identification unit, the detection unit causing the corresponding dose to be supplied to the filter-holder when the latter is positioned and held by the supporting means of the metering and grinding device, a wireless communicating device on the espresso coffee machine for transmitting the information generated by the identification unit to the detection unit on the coffee bean metering and grinding device.

BRIEF DESCRIPTION OF THE DRAWINGS

The invention will be described in further detail below with reference to a preferred embodiment thereof shown by way of non-limiting example in the accompanying drawings, in which.

DESCRIPTION OF THE PREFERRED EMBODIMENT

Figure 1:
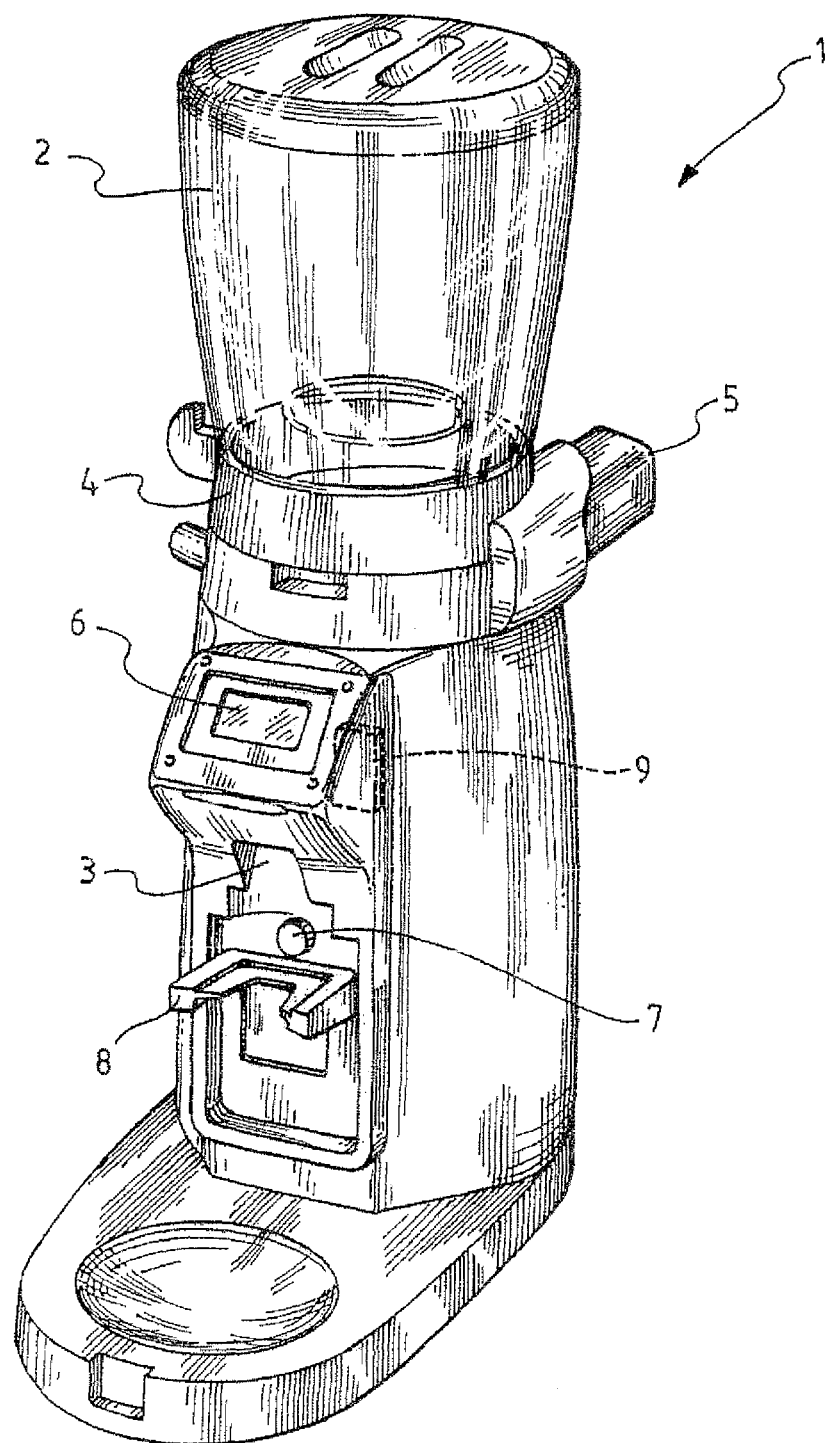
FIG. 1 is a perspective diagrammatic view of a machine for preparing and dispensing espresso coffee provided with a coffee bean metering and grinding device of the invention.

A metering and grinding device provided with a hopper 2 is shown overall by 1 in FIG. 1.

Roasted coffee beans are kept in the hopper 2 in order to be ground to order to fill the filter-holder of a machine for preparing espresso coffee as will be explained in further detail below.

The metering and grinding device 1 is also provided with an outlet 3 discharging the coffee, ground by a conventional grinder (not shown) within the device 1, which is reached by the coffee beans from the hopper 2.

The grinder may be adjusted to vary the degree of grinding by means of an adjustment nut 4 and an actuator 5 which causes the nut 4 to move.

The device 1 is provided with a communication interface 6, preferably but not exclusively in the form of a touch screen which may show virtual electronic keys, by means of which the operating conditions of the device may be adjusted and the current condition of the device may be indicated.

This device 1 is provided with a sensor 7 which detects the presence of a filter-holder of a coffee machine provided with a code, for instance a colour code, as will be described in detail below, when the filter-holder is positioned on the support fork 8 which retains it below the outlet 3 when it is being refilled with the ground coffee.

The metering and grinding device 1 is lastly provided internally with an electronic circuit board, shown overall by 9, including memory and radio communication devices of the short-range LAN wireless type, which acts as the unit detecting the information received.

By means of the circuit board 9, as will be explained in detail below, the metering and grinding device 1 is able to exchange information with other apparatus, for instance, a machine for preparing espresso coffee shown overall by 10 in FIG. 2.

Figure 2:
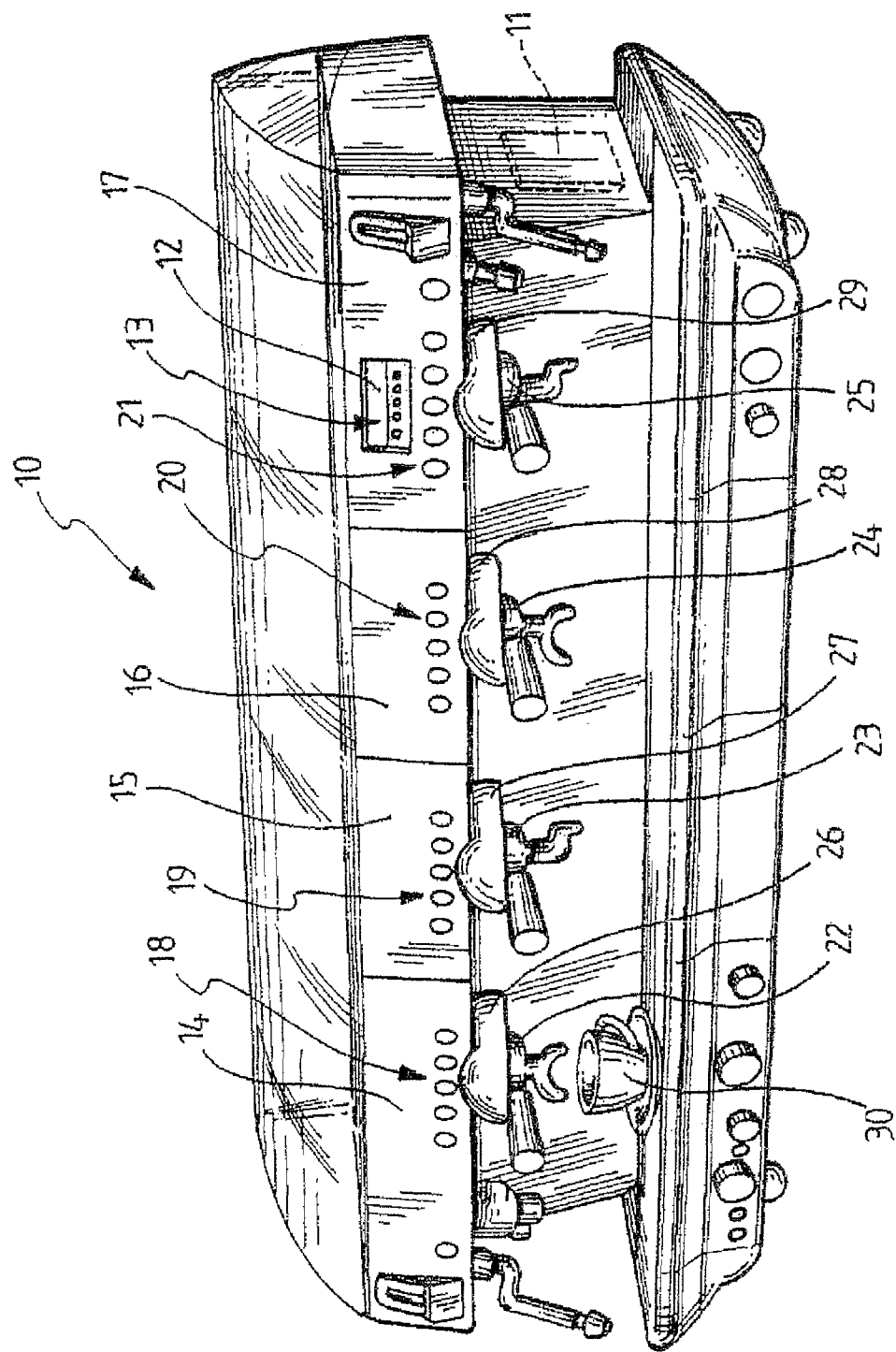
FIG. 2 is a perspective diagrammatic view of a machine for preparing and dispensing espresso coffee provided with a plurality of dispensing units.

In FIG. 2, the espresso coffee machine 10 of the invention comprises an electronic circuit board 11 including memory and short-range radio communication devices compatible with the electronic circuit board 9 of the metering and grinding device 1.

The circuit board 11 is housed inside the machine 10 and acts as a unit identifying the filter-holder of the selected dispensing unit and the type of beverage ordered and selected, as will be described in further detail below.

The machine 10 is further provided with a communication screen 12 showing information on the operation of the machine, with a relative programming keyboard 13 acting as a unit identifying the type of coffee ordered and the relative dose. The keyboard and screen functions may also be performed by a touch screen which is known per se, possibly with virtual electronic keys.

The machine 10 is provided with a plurality of dispensing units, shown respectively by 14, 15, 16 and 17. Each of the dispensing units is provided with respective push buttons shown by 18, 19, 20 and 21 which control the selection of corresponding dispensing operations from the respective dispensing units and which are connected to the identification unit formed by the circuit board 11.

Each dispensing unit is provided with a respective filter-holder shown by 22, 23, 24 and 25, each of which bears a code which can be recognised both by the machine 10 and by a metering and grinding device of the type shown in FIG. 1.

For this purpose, each dispensing unit of the machine 10 is provided with a respective sensor 26, 27, 25 and 29 able to detect the code of each filter-holder and, at the same time, the presence of containers 30 for collecting the beverage disposed below the dispensing nozzles of the filter-holders.

Figure 3:
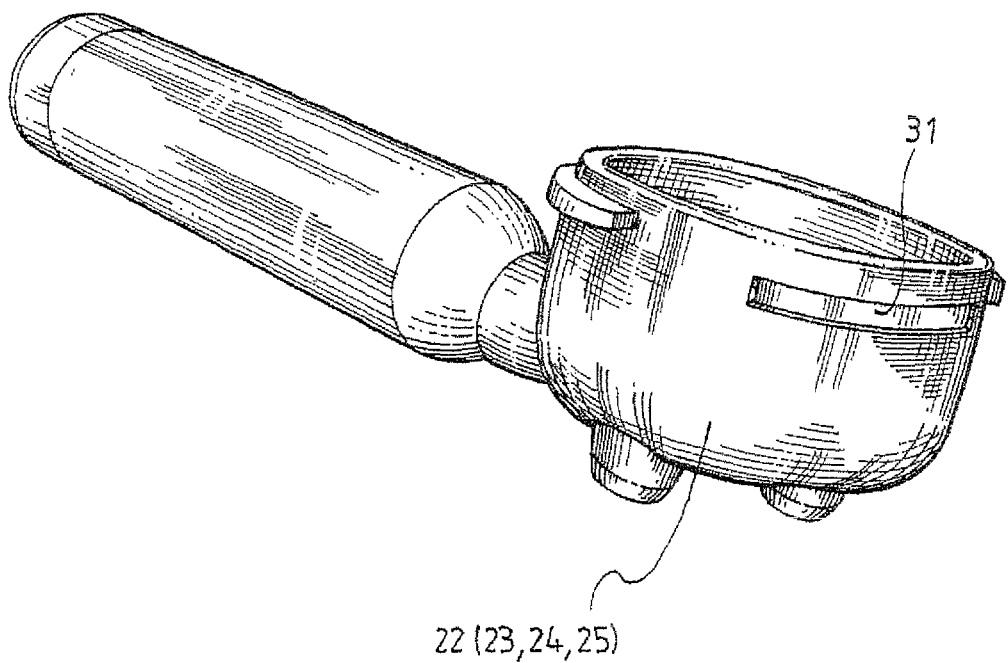
FIG. 3 is a perspective diagrammatic view of a filter-holder.

FIG. 3 shows an example of a filter-holder 22, 23, 24 or 25, with its relative code 31. The code may be in the form of a bar code or in the form of a coloured bar.

The machine 10 may be programmed by means of the screen 12 and the keyboard 13 or by an external programming device in communication with the electronic circuit board 11. In this latter case, the machine 10 may in turn carry out programming and exchange information with an apparatus which communicates with it via the circuit board 11, for instance the metering and grinding device 1 of FIG. 1 provided with the electronic circuit board 9, acting as a detection unit, comprising receiver and transmitter devices or with a plurality of machines as shown in FIG. 4 and described in detail below.

Figure 4:
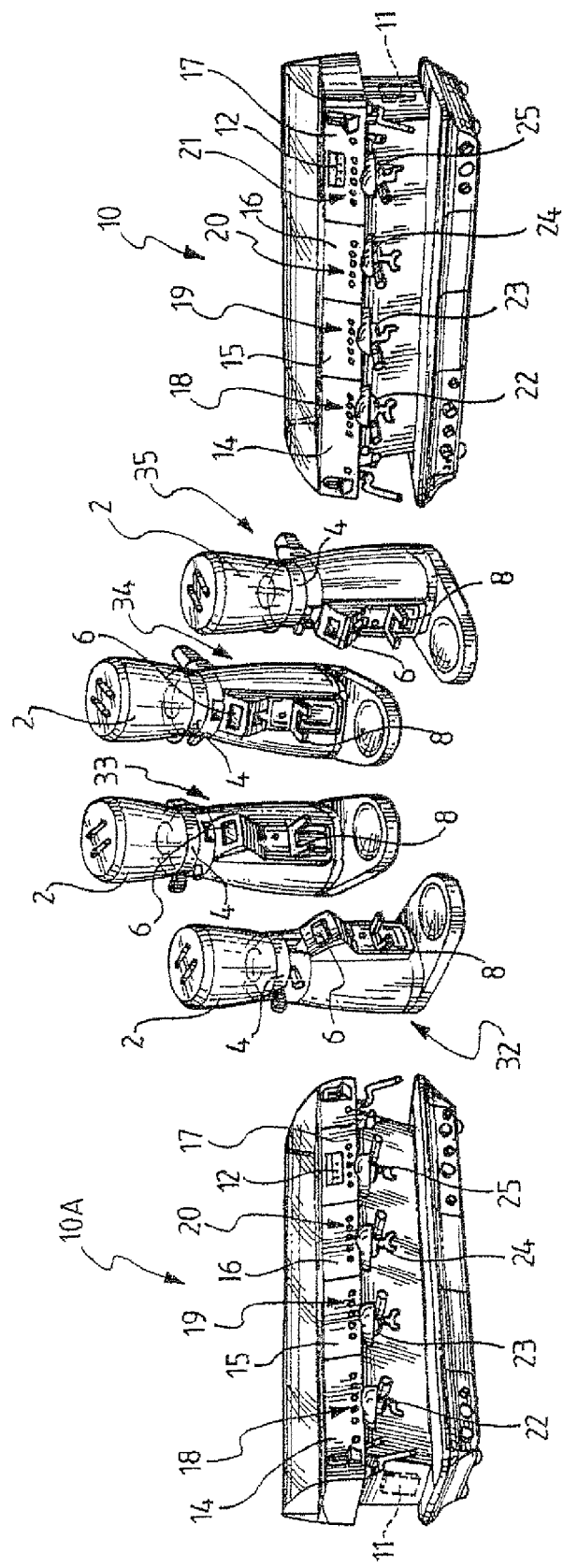
FIG. 4 shows an apparatus Comprising two machines for preparing and dispensing espresso coffee and four coffee bean metering and grinding devices according to the invention.

FIG. 4 shows an installation of a plurality of machines for preparing coffee-based beverages, which installation is particularly suited to public premises, for instance service stations along motorways.

The installation, in the embodiment shown, comprises a pair of coffee machines shown by 10 and 10A, each having the structural and operational features as described with reference to FIG. 2, and a plurality of metering and grinding devices shown respectively by 32, 33, 34 and 35, each having the structural and operational features as described with reference to the metering and grinding device 1 of FIG. 1.

In accordance with the invention, the metering and grinding device 32 for instance contains, in its hopper 2, a mixture of highly roasted coffee beans suited to an Italian espresso coffee; this device is therefore programmed to dispense the quantities of ground coffee needed for one or two small cups of Italian espresso coffee and the nut 4 is set to provide a grain size likely to optimise their delivery in a dispensing time of 25 seconds.

The second metering and grinding device 33, in accordance with the invention, for instance contains, in its hopper 2, a mixture of lightly roasted coffee beans suited to a filter coffee of the type consumed in central and northern Europe; the device is thus programmed to dispense the quantities of ground coffee needed for one or two cups of filter coffee and the nut 4 is set to provide a grain size likely to optimise their delivery in a dispensing time of 25 seconds.

The third metering and grinding device 34, also of the type shown in FIG. 1, contains, in its hopper 2, a mixture of highly roasted decaffeinated coffee beans suited to an Italian espresso coffee; the device 34 is therefore programmed to dispense the quantities of ground coffee needed for one or two small cups of Italian decaffeinated espresso coffee and the nut 4 is set to provide a grain size likely to optimise their delivery in a dispensing time of 25 seconds.

Lastly, the fourth metering and grinding device 35, also of the type shown in FIG. 1, for instance contains, in its hopper 2, a mixture of lightly roasted decaffeinated coffee beans suited to a filter coffee of the type consumed in central and northern Europe; the device 35 is thus programmed to dispense the quantities of ground coffee needed for one or two cups of filter coffee and the nut 4 is set to provide a grain size likely to optimise their delivery in a dispensing time of 25 seconds.

Considering the coffee machines which make up the installation of FIG. 4, it will be appreciated that, for instance, the machine shown by 10 comprises the dispensing unit 14 programmed to dispense the doses for two cups of non-decaffeinated Italian espresso coffee by pressing a key of a relative keyboard 18 or the doses for two cups of decaffeinated Italian espresso coffee by pressing another key on the keyboard 18; the dispensing unit 14 is also programmed to recognise the relative filter-holder 22 which bears a filter suited to Italian espresso coffee.

A further dispensing unit shown, for instance, by 15 is programmed to dispense the doses for one cup of non-decaffeinated Italian espresso coffee by pressing a key of its keyboard 19 or the doses for one cup of decaffeinated Italian espresso coffee by pressing another key on the keyboard 19; the dispensing unit 15 is also programmed to recognise the relative filter-holder 23 which bears a filter suited to Italian espresso coffee.

Continuing with the description of the installation shown in FIG. 4, the dispensing unit 16 is for instance programmed to dispense the doses for two cups of non-decaffeinated filter coffee by pressing a key of the keyboard 20 or the doses for two cups of decaffeinated filter coffee by pressing another key on the keyboard 20; the dispensing unit 16 is also programmed to recognise the relative filter-holder 24 which bears a filter suited to filter coffee.

Lastly, the dispensing unit 17 is programmed to dispense the doses for one cup of non-decaffeinated filter coffee by pressing a key of the keyboard 21 or the doses for one cup of decaffeinated filter coffee by pressing another key on the keyboard 21; the dispensing unit 17 is also programmed to recognise the relative filter-holder 25 which bears a filter suited to filter coffee.

The second machine 10A, which is structurally and functionally identical to the coffee machine 10 shown in FIG. 2, may be programmed and arranged in the same way as described for the machine 10 or its dispensing unit 14 may in particular be programmed to dispense doses of black coffee in a quantity of 250 cm$^3$ in 25 seconds.

In an installation as illustrated in FIG. 4 and described above, various types of coffee-based beverages may be dispensed in accordance with the practical and operational examples described below.

Bar staff working with the apparatus as described and required, for instance, to prepare two small cups of non-decaffeinated Italian espresso coffee will input what is to be dispensed on the keyboard 18 corresponding to the dispensing unit 14 and take the filter-holder 22 from the dispensing unit. As a result of pressing the key, the machine 10 communicates the request to the metering and grinding device 32 which contains non-decaffeinated roasted coffee beans in its hopper 2.

The screen 6 on the metering device 32 lights up, showing the operator the position from which the ground coffee is to be taken.

The operator places the filter-holder 22 on the fork 8 below the outlet 3 of the metering device in the vicinity of the sensor 7 which, recognising that the filter-holder 22 corresponds to the type of coffee requested by the machine 10, supplies the necessary quantity of ground coffee.

The operator can then take the filter-holder 22 with the ground coffee and move it to the dispensing unit 14 of the machine 10 which recognises the filter-holder via the sensor 26.

Once the container 30 has been placed below the dispensing unit 14, the required coffee can start to be dispensed as the sensor 26 has also detected the presence of the container 30.

When preparing the other kinds of coffee described above, the operator works in the same way, each time taking the ground coffee from the metering and grinding device corresponding to the beverage to be dispensed.

In accordance with a further example, it is assumed that the dispensing unit 14 on the machine 10A has been prepared to dispense a beaker of 250 cm$^3$ of black coffee to be made from the lightly roasted mixture in the hopper of the metering and grinding device 33.

In this case, as it is necessary during preparation of the beverage to dispense, in 25 seconds, a quantity double that of a filter coffee of 120 cm$^3$ dispensed by the dispensing unit 16, use is therefore made of more coarsely ground coffee. When the operator requests a black coffee from the dispensing unit 14 of the machine 10A, the latter communicates the request for the beverage to the metering and grinding device 33 which is actuated and has its nut 4 adjusted by means of the actuator 5 in order to provide the ground coffee with the adjustment required for this kind of coffee, confirming that what has been requested is available on the screen 6. When the operator requests a filter coffee, however, the actuator 5 returns the nut 4 to the optimum setting for this latter type of coffee.

If the machines 10 and 10A are provided with individual systems for regulating the dispensing pressure and temperature of each dispensing unit, it is also possible, by means of the push buttons 18, 19, 20 and 21, to request different types of coffee from the same dispensing unit 14, 15, 16 and 17, in each case requesting a mixture with a specific quantity and type of ground coffee from one of the metering and grinding devices 32, 33, 34 and 35. In the installation shown in FIG. 4, each metering and grinding device 32, 33, 34 and 35 is able to receive the requests from the dispensing units 14, 15, 16 and 17 of the machines 10 and 10A and is adapted to dispense the type of ground coffee requested.

If the machines are arranged such that they produce, in a dedicated manner, only one type of ground coffee from each dispensing unit 14, 15, 16 and 17, operation may also be streamlined. In this case, by taking out one of the filter-holders 22, 23, 24 or 25, the machine 10 or 10A will directly request the type of coffee corresponding to that particular filter-holder from the metering device and it is sufficient to dispose the filter-holder in question on the fork 8 of the metering device which has been actuated in order automatically to receive the dose in the filter-holder; when the filter-holder is again disposed in the dispensing unit, dispensing of the coffee starts automatically.

The apparatus of the present invention has many advantages. The following may in particular be mentioned.

Signalling of the request directly to the corresponding metering and grinding device prevents errors which could cause, for instance, a decaffeinated coffee to be served to a person who has ordered a normal coffee or, worse, a normal coffee to a person who has ordered a decaffeinated coffee.

If a first bar operator requests a type of coffee from the machine 10 and a second bar operator requests a different type of coffee from the second machine 10A, two metering and grinding devices are actuated but on each of these the touch screen is lit and indicates the type of coffee that has been requested from it, making it possible to prevent any errors from the point of view of reversing the filter-holders to be refilled. Moreover, as a result of the presence sensor 7 which recognises the code of the filter-holder, the metering and grinding device supplies the ground coffee only if it recognises the filter-holder corresponding to the request received by the machine, in practice ruling out any possibility of error as regards the positioning of the filter-holder.

The fact that the dispensing unit 14, 15, 16 and 17 is enabled only if the filter-holder 22, 23, 24 and 25 corresponding to the code of the particular unit is applied to it prevents errors such as the provision of an espresso coffee from a dispensing unit calibrated for filter coffee and vice versa; the machine 10 or 10A is actuated only if the metering and grinding device 32, 33, 34 or 35 has confirmed to the dispensing unit that it has carried out the required grinding.

At the end of dispensing, the machine 10 or 10A can detect and memorize, in an appropriate electronic log, the length of the dispensing time and may compare the progressive mean of the dispensing time by comparing it with the optimum dispensing time programmed for each kind of coffee.

As coffee is a hygroscopic raw material, it is strongly affected by ambient moisture and it is known to operators in the sector that an increase in moisture tends to increase coffee's resistance to the passage of water, the opposite happening in a dry climate. As it is desired to keep a high quality of dispensing by maintaining the dispensing time at an optimum value, the bar operator should undertake frequent adjustments of the extent of grinding. In accordance with the present invention, the machine detects a deviation of the dispensing time from the admissible tolerance, and may directly inform the metering and grinding device that grinding needs to be adjusted, the metering and grinding device then acting on the nut 4 by means of the actuator 5 in order to bring the dispensing time back within the admissible tolerance.

What we claim is:

1. A system for refilling the filter-holders of a machine for the preparation of espresso coffee with selected doses of ground coffee to order, comprising at least one machine for the preparation of espresso coffee, the machine being provided with a plurality of dispensing units for the preparation of respective coffee beverages, each dispensing unit comprising a respective detachable filter-holder and a plurality of keys for selecting the beverage to be dispensed by the relative dispensing unit, at least one coffee bean grinder and metering device provided with a hopper for supplying coffee beans, the coffee bean grinder being adjustable to provide a desired grain size for the ground coffee, an outlet on the coffee bean grinder and metering device for supplying the ground coffee and a fork for supporting a selected filter-holder on the coffee bean grinder and metering device in alignment with a supply outlet to be refilled with the dose of ground coffee, the filter-holder and its respective dispensing unit being provided with a code and a respective code detector to identify the filter holder to be retained on the dispensing unit, the coffee bean grinder and metering device comprising a code detector disposed in the vicinity of the fork supporting the filter-holder for refilling with the dose of ground coffee, an identification unit on the espresso coffee machine generating information for recognising a selected filter-holder of a dispensing unit and information related to the type of dose with which the filter-holder is to be refilled, a detection unit on the coffee bean grinder and metering device for detecting the information generated by the identification unit, the detection unit causing the corresponding dose to be supplied to the selected filter-holder when the latter is removed from its respective dispensing unit and is supported by the fork of the coffe bean grinder and metering device, a wireless communicating device on the espresso coffee machine for transmitting the information generated by the identification unit to the detection unit on the coffee bean grinder and metering device.

2. The system according to claim 1, wherein the information related to the type of dose generated by the identification unit borne by the espresso coffee machine comprises information related to the quantitative value of the dose to be supplied to the filter-holder of a specific dispensing unit of the machine.

3. The system according to claim 1, wherein the information related to the type of dose generated by the identification unit borne by the espresso coffee machine comprises information concerning the quality of the coffee to be supplied to the filter-holder of a specific dispensing unit of the machine.

4. The system according to claim 1, wherein the information related to the type of dose generated by the identification unit borne by the espresso coffee machine comprises information related to the gram size with which the dose of coffee is to be supplied to the filter-holder of a specific dispensing unit of the machine.

5. The system according to claim 1, comprising a plurality of coffee bean grinder and metering devices.

6. The system according to claim 1, comprising a plurality of machines for the preparation of espresso coffee.

7. The system according to claim 1, wherein the identification unit comprises electronic means associated with the plurality of keys of each dispensing unit, the electronic means comprising memory devices for storing the information for recognising a selected filter-holder of a dispensing unit and information on the type of dose associated with each key of the plurality of keys, devices for transmitting this information, wherein the detection unit of the coffee bean grinder and metering device comprises electronic means with receiver devices adapted to receive the information transmitted by the identification unit and devices for converting the information into commands for the actuation of the coffee bean grinder and metering device in accordance with the information received for the selected filter-holder.

8. The system according to claim 1, wherein the filter-holder of each dispensing unit of the espresso coffee machine is provided with a coloured member with a respective colour acting as a code.

9. The system according to claim 1 wherein the espresso coffee machine comprises, in the vicinity of each dispensing unit, a detector of the presence of a container for collecting the beverage when it is positioned below the dispensing unit.

10. A method for refilling filter-holders removably mounted on a plurality of dispensing units of a machine for the preparation of coffee-based beverages with a dose of coffee ground to order, the dose being selected in relation to the quality of the coffee or the extent to which it is ground or the quantitative value thereof, wherein each filter-holder and its respective dispensing unit are coded to identify the filter-holder to be mounted on each dispensing unit, moving a selected filter-holder from its respective dispensing unit to a coffee bean grinder and metering device of the machine, providing the machine with an electronic identification unit that generates information for recognizing the selected filter-holder and information related to the dose with which the selected filter-holder is to be refilled, sending the information to an electronic detection unit on the coffee bean grinder and metering device, actuating the coffee bean grinder and metering device in correlation with the information received by the detection unit to supply a corresponding dose of ground coffee to the selected filter-holder when the latter is supported on the grinder and metering device, and moving the refilled selected filter-holder back to its respective dispensing unit.

11. A method according to claim 10, wherein the supply of the information from the identification unit to the detection unit of the coffee bean grinder and metering device takes place by transmission using wireless technology.

\* \* \* \* \*